(12) United States Patent
Schoeny et al.

(10) Patent No.: US 10,455,758 B2
(45) Date of Patent: Oct. 29, 2019

(54) SEED LEVEL DETECTION IN A SEED METER

(71) Applicant: CNH Industrial America, LLC, New Holland, PA (US)

(72) Inventors: Christopher Schoeny, Yorkville, IL (US); Chad M. Johnson, Arlington Heights, IL (US)

(73) Assignee: CNH Industrial America LLC, New Holland, PA (US)

( * ) Notice: Subject to any disclaimer, the term of this patent is extended or adjusted under 35 U.S.C. 154(b) by 82 days.

(21) Appl. No.: 15/592,363

(22) Filed: May 11, 2017

(65) Prior Publication Data

US 2018/0325017 A1 Nov. 15, 2018

(51) Int. Cl.
*A01C 7/04* (2006.01)
*A01C 7/10* (2006.01)

(52) U.S. Cl.
CPC .............. *A01C 7/046* (2013.01); *A01C 7/105* (2013.01)

(58) Field of Classification Search
CPC ......... A01C 7/046; A01C 7/044; A01C 7/042; A01C 7/04; A01C 7/00; A01C 7/105; A01C 7/102; A01C 7/10; A01C 7/08
See application file for complete search history.

(56) References Cited

U.S. PATENT DOCUMENTS

| | | | |
|---|---|---|---|
| 5,963,119 A | 10/1999 | Littke | |
| 7,478,603 B2 | 1/2009 | Riewerts et al. | |
| 7,725,251 B2 | 5/2010 | Steimel | |
| 7,726,251 B1 | 6/2010 | Peterson et al. | |
| 8,925,471 B2 | 1/2015 | Adams et al. | |
| 8,942,896 B2 | 1/2015 | Mayerle | |
| 9,481,294 B2 | 11/2016 | Sauder et al. | |
| 9,491,901 B2 | 11/2016 | Gentili | |
| 9,941,901 B2 | 4/2018 | Chen et al. | |
| 2011/0046776 A1* | 2/2011 | Goldman | A01C 7/046 700/225 |
| 2015/0156964 A1 | 6/2015 | Krohn et al. | |
| 2015/0195988 A1 | 7/2015 | Radtke et al. | |
| 2015/0216107 A1 | 8/2015 | Wendte et al. | |
| 2015/0223391 A1 | 8/2015 | Wendte et al. | |
| 2016/0249525 A1 | 9/2016 | Baurer et al. | |
| 2016/0255766 A1 | 9/2016 | Assy et al. | |

OTHER PUBLICATIONS

John Deere/US "Spacing and Singulation" www.deere.com Dated Feb. 9, 2017 (3 pages).
Case IH "Precision Disk™ 500T Air Drill" www.caseih.com Dated Feb. 9, 2017 (23 pages).

* cited by examiner

*Primary Examiner* — Christopher J. Novosad
(74) *Attorney, Agent, or Firm* — Rebecca L. Henkel; Rickard K. DeMille

(57) ABSTRACT

A vacuum seed meter includes a vacuum channel and a seed disc having seed cells defined as openings through a perimeter region of the seed disc, which rotates through the vacuum channel. The seed meter includes a sensor that addresses the seed cells in a way that enables prediction of imminent seed starvation of the seed meter.

20 Claims, 13 Drawing Sheets

EMPLOYING A FIRST SENSOR FOR EMITTING DETECTION SIGNALS TO DETECT WHETHER SEED IS PRESENT WITHIN A SEED CELL OF THE SEED DISC DISPOSED IN THE SEED CHAMBER OF THE HOUSING

EMPLOYING A SECOND SENSOR TO DETECT WHETHER A SEED IS ABSENT FROM WITHIN A SEED CELL IN THE DROP ZONE OF THE HOUSING

USING THE SECOND SENSOR'S DETECTION OF THE ABSENCE OF A SEED IN THE DROP ZONE TO COORDINATE WHEN TO SAMPLE THE FIRST SENSOR'S DETECTION SIGNALS

FIG. 13

SEED LEVEL DETECTION IN A SEED METER

FIELD OF THE INVENTION

The present subject matter relates generally to seed meters and more particularly to multi-variety seed meters.

BACKGROUND OF THE INVENTION

Multi-variety seed meters are designed to switch seed varieties on the fly and process two or more varieties of seed through the same meter. In order to minimize mixing of varieties within the meter, processing of the currently metered variety must be discontinued for some period of time before the seed meter can be reconfigured to process the next variety of seed. This is also known as starving the meter of the current variety of seed before feeding the meter with the next variety of seed.

Due to their relatively low cost, optical sensors and capacitive proximity sensors are commonly used in agriculture. However, optical sensors are easily blinded by dust buildup from the seeds, the field and from the powdered graphite that is often used as a seed lubricant. In the case of capacitive proximity sensors, they are triggered falsely by buildups of powdered graphite on the sensor. Thus, the seed meter environment is not conducive to using the most cost-effective sensors currently available.

BRIEF DESCRIPTION OF THE INVENTION

Aspects and advantages of the invention will be set forth in part in the following description, or may be obvious from the description, or may be learned through practice of the invention.

A sensor is placed inside the vacuum channel of a vacuum seed meter. The sensor, examples of which can include an optical sensor or a capacitive proximity sensor, is aligned with the seed cell path on the seed disc and desirably aimed at the deepest penetration of the seed cells carried by the seed disc within the seed chamber. The signal generated by the sensor can be provided to a controller to indicate when the seed cells of the seed meter are being starved of seed and thus indicate to the controller when one or more operating parameters of the seed meter needs to be adjusted to prevent the occurrence of skips in the field.

The signal generated by the sensor also can be provided to a controller to indicate when the seed meter is about to be starved of a first variety of seed before the controller switches the seed meter to dispense a second variety of seed. Due to the constant high velocity air passing through the vacuum channel, any accumulation or build-up of dust or other contaminants on the sensor disposed in the vacuum channel is prevented to a significant degree.

If the optical sensor is a reflectance style sensor, the entire sensor would be located within the vacuum channel. Light reflecting off the seed disc and the seed in the seed cells as the seed cells pass by the sensor would be received by the sensor assembly. If the optical sensor is a break beam style sensor, either the emitter or the receiver would be fitted in the vacuum channel while the other element would be located behind the seed pool in the seed meter. Though one of these elements would be susceptible to dust buildup, the other element would remain in a relatively clean environment that would remain relatively unaffected by any buildup of dust or other contaminants.

In addition to sensing when the seed meter is starved of seeds, the sensor also is useful during steady-state planting of any given variety. For the sensor also alerts the operator to a situation when seed is not feeding well into the seed meter.

In one embodiment, a second sensor is disposed outside of the vacuum channel and just after the seed drop location to alert the operator when seeds are not releasing properly from the seed cells in the seed disc and thus provides information useful in troubleshooting seed spacing. In this embodiment, the second sensor can be used by the controller as a timing mechanism that determines the frequency with which the seed cells will pass in front of the detection zone of the first sensor so that the signals received from the first sensor can be evaluated by the controller in a coordinated fashion and thereby enable the controller to focus its evaluations on only those intervals during which a seed cell is presented to the first sensor for detection of either the presence or absence of a seed within the seed cell.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 13 provides a schematic representation of an embodiment of a methodology according to one aspect of the present invention.

DETAILED DESCRIPTION OF THE INVENTION

Figure 1:
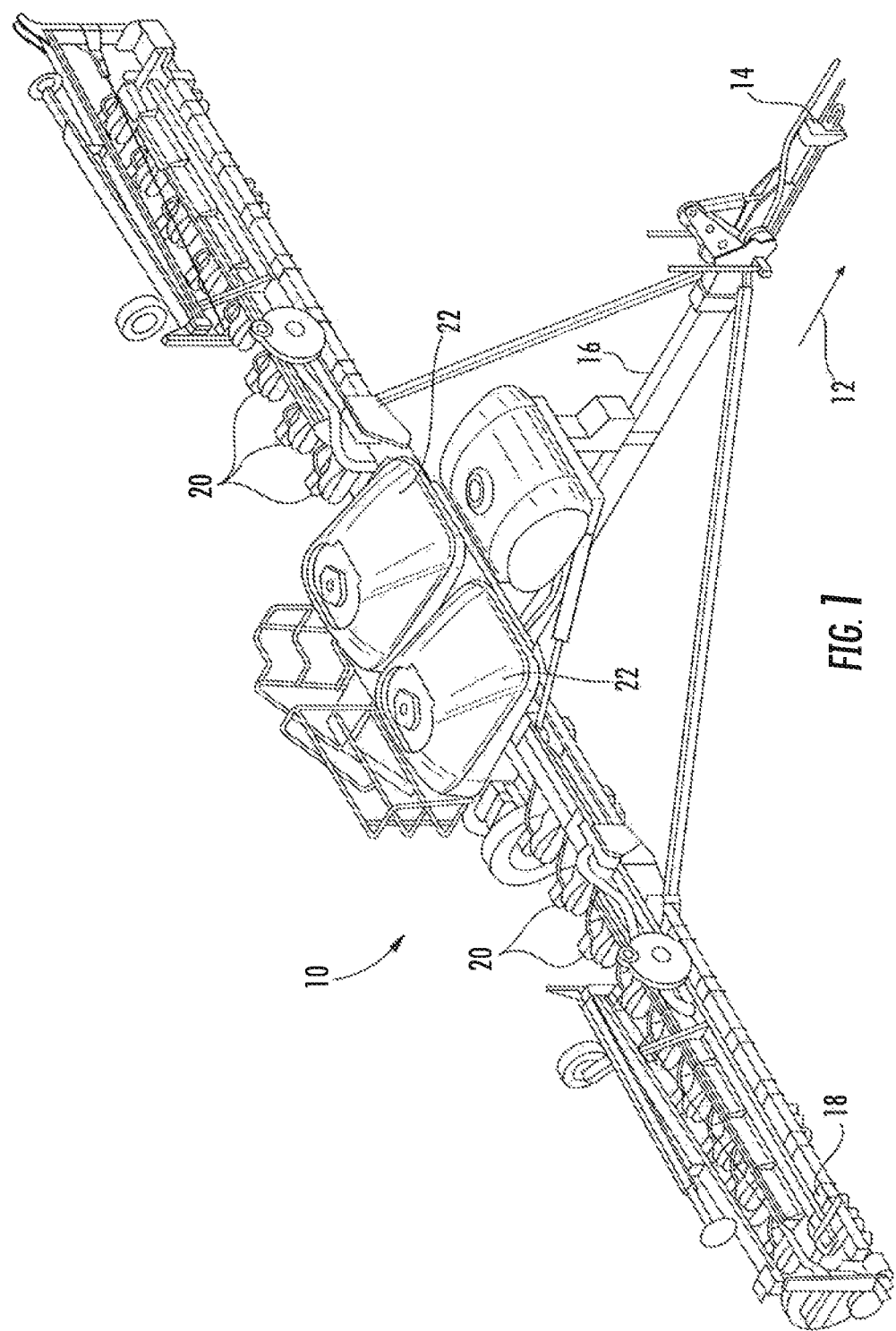
FIG. 1 provides a perspective view of a planting implement configured to deposit seeds into a soil surface, in accordance with an embodiment.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As known in the art, seed planting implements generally include multiple row units to plant simultaneously several rows of seeds into the ground. Each row unit may include a seed meter to control rate and/or spacing of the deposited seeds. Moreover, since each of the multiple row units is spaced apart from even its closest row unit, the operating conditions experienced by each row unit may vary.

In some embodiments, different seed meters may be used within different row units to plant different types of seeds with differing size, shape, and/or weight at the same time. For example, the size and weight of one type of hybrid corn seeds may be greater than for another type of hybrid corn seeds. A first seed meter of a first row unit may control the planting of one type of hybrid corn seeds and an immediately adjacent second seed meter of a second row unit may control the planting of another type of hybrid corn seeds.

In some embodiments, a multi-variety seed meter will be fed seeds from multiple hoppers that contain different seeds or a single hopper with multiple separated compartments that contain different seeds. Such a multi-variety seed meter may include separate gates that control the feeding of seeds to the seed meter from different hoppers or compartments within a single hopper. In other embodiments, gates may be provided on the hoppers to control the flow of seed to the seed inlet of the seed meter. Still other embodiments employ fluted roles that selectively send a dosage of seed into the seed meter.

Generally, a vacuum seed meter is one that employs vacuum pressure to attach seeds to a rotating seed disc, which controls the rate at which seeds are output by the seed meter. As used herein, "vacuum pressure" is intended to describe a pressure that is lower than ambient atmospheric pressure and not necessarily a true vacuum. In operation, the vacuum pressure needed to achieve the desired planting rate for each row unit may be different. More specifically, the magnitude of the vacuum pressure sufficient to enable proper planting of corn seeds may be too large for the planting of soybean seeds, and may cause multiple soybean seeds to be planted in the same location (e.g., a multiple), for example, because multiple seeds are attached to a single seed cell on the seed disc due to the excessive vacuum pressure. On the other hand, the magnitude of the vacuum pressure sufficient to enable proper planting of soybean seeds may be too small for planting corn seeds and may cause a seed not be planted when expected (e.g., a skip), for example, because a seed is not attached to at least one of the seed cells on the seed disc due to the insufficient vacuum pressure.

Moreover, seed meters closer to a single centralized vacuum source may receive greater vacuum pressure than seed meters farther from the vacuum source. As such, the seed meters closer to the vacuum source may experience more multiples, and the seed meters farther from the vacuum source may experience more skips. Accordingly, the different operating conditions experienced by each seed meter may result in inconsistent planting of seeds.

Thus, to improve the operation of a planting implement, techniques described herein increase the amount of control over operation of each individual seed meter. More specifically, in some embodiments, control over operation of a seed meter may be increased by including a controller that receives signals from at least one sensor and desirably a second sensor to detect when the seeds are either populating particular seed cells or absent from a particular seed cell at a predetermined location within the seed meter. One of those particular locations is where the seed cell would be expected to acquire seeds when the seed chamber is almost depleted of seed. A second one of those particular locations is where the seed cell is outside of the influence of the vacuum channel and expected to be empty of any seed.

As will be described in more detail below, the vacuum pressure provided by each direct vacuum source may be independently adjusted to increase or decrease vacuum pressure supplied to the respective seed meter. For example, when there is a detection of a skip, which occurs when a seed is not deposited when expected, then the vacuum pressure supplied to the corresponding seed meter may be increased. Similarly, when there is a detection of a multiple, which occurs when multiple seeds are deposited when only one seed is expected, then the vacuum pressure to the corresponding seed meter may be decreased.

In embodiments where each seed meter on a planting implement includes its own direct vacuum source, the operation of each seed meter is individually and independently adjusted by controlling the corresponding direct vacuum source, and thus additional plumbing to a centralized vacuum source is eliminated. As will be described in more detail below, the techniques described herein may reduce energy consumption and enhance operational consistency, for example by reducing the number of skips and multiples, even when different types of seeds are to be planted by a multi-variety seed meter.

As shown in FIG. 1, a planting implement 10 that may be used to deposit seeds into a soil surface desirably includes a hitch assembly 14, a main frame assembly 16, a tool bar 18, row units 20, and seed tanks 22. When a work vehicle such as a tractor or other prime mover is coupled to the implement 10 by the hitch assembly 14, the implement 10 may be towed along a direction of travel 12 by the work vehicle.

As depicted in FIG. 1, the hitch assembly 14 is coupled to the main frame assembly 16, and the main frame assembly 16 is coupled to the tool bar 18. As additionally depicted in FIG. 1, the tool bar 18 is coupled to multiple row units 20. Thus, as the work vehicle tows the implement 10, each of the row units 20 may deposit seeds at a desired depth beneath the soil surface, thereby establishing rows of planted seeds. In some embodiments, the bulk of the seeds to be planted may be stored in the seed tanks 22. Thus, as seeds are planted by the row units 20, a pneumatic distribution system may distribute additional seeds from the seed tanks 22 to the individual row units 20.

It should be noted that while the illustrated implement 10 includes 24 row units 20, alternative implements may include more or fewer row units 20. For example, certain implements 10 may include 6, 8, 12, 16, 24, 32, or 36 row units, or more. In addition, the spacing between row units may be particularly selected based on the type of seed being planted. For example, the row units may be spaced 30 inches from one another for planting corn, and 15 inches from one another for planting soybeans.

Figure 2:
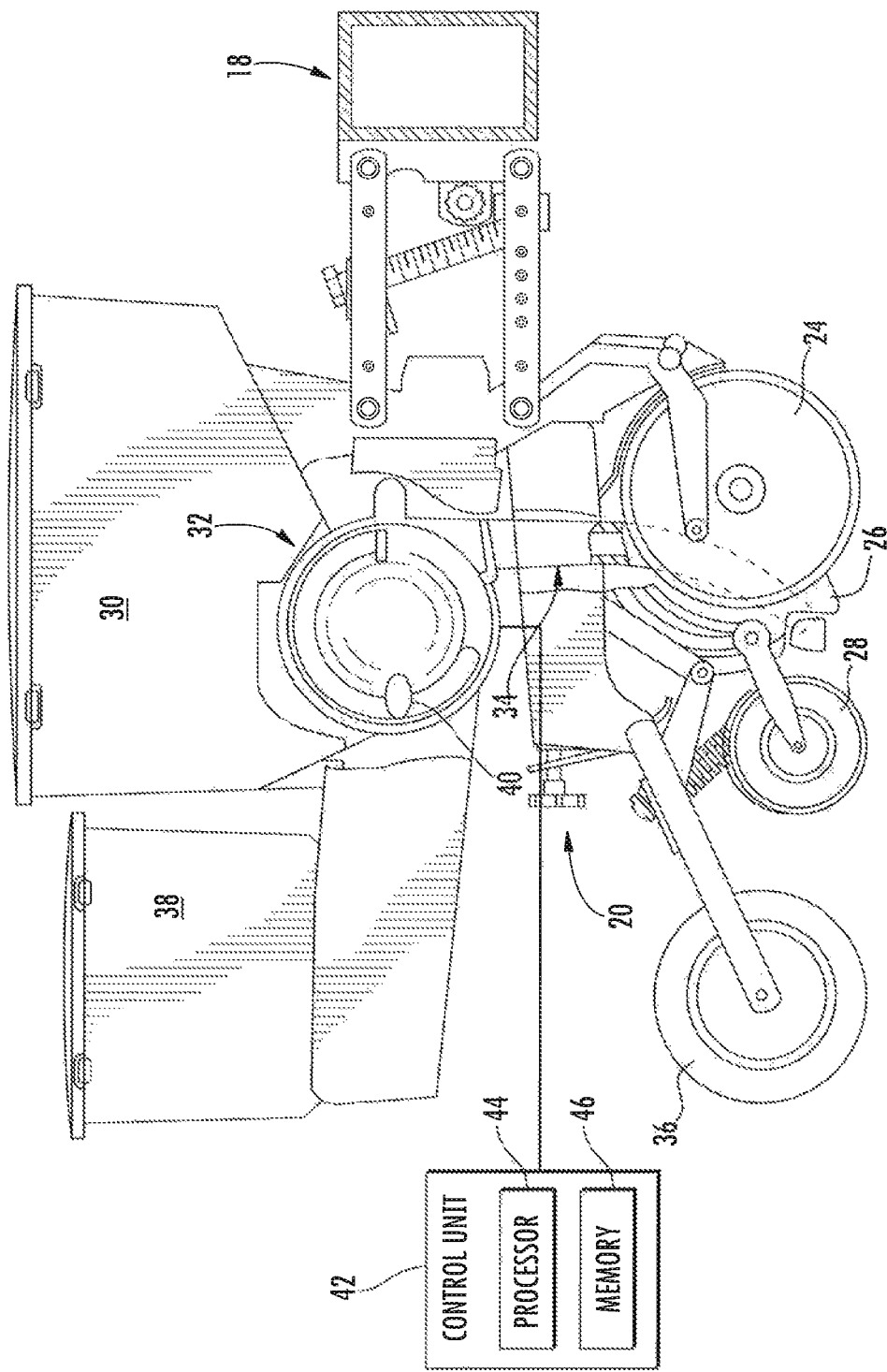
FIG. 2 provides a side view of a row unit on the planting implement of FIG. 1, in accordance with an embodiment.

Once distributed, the seeds may be deposited in rows by the individual row units 20. FIG. 2 depicts a row unit 20 that may be used to deposit seeds. As depicted in FIG. 2, the row unit 20 is coupled to the tool bar 18. To facilitate depositing seeds, the row unit 20 includes a furrow opener disc 24, an opener shoe 26, a closing disc 28, a seed hopper 30, a seed meter 32, a seed tube 34, a press wheel 36, and a granular chemical product hopper 38.

As the row unit 20 travels along a field, the furrow opener disc 24 and the opener shoe 26 engage the soil and cooperate to form a trench for seeds to be deposited. In the embodiment depicted in FIG. 2, the seeds received from the seed tanks 22 (FIG. 1) may be stored in the seed hopper 30 before they are deposited. From the seed hopper 30, the seeds are transferred into the entrance of the seed meter, which is indicated generally in FIG. 2 by the numeral 32. The seeds are discharged from the outlet of the seed meter 32 and into the inlet of the seed tube, which is indicated generally in FIG. 2 by the numeral 34, at the upper end thereof such that the seeds travel under the influence of gravity down through the seed tube 34 and exit from the bottom end of the seed tube 34 into the trench. Once the seeds are deposited into the trench, the closing disc 28 covers the deposited seeds, and the press wheel 36 packs the soil over the deposited seeds.

The manner in which the seeds are dispensed to the seed tube 34 from the output of the seed meter 32 determines the rate and/or spacing of the seeds into the trench. In other words, by controlling the output of seeds from the seed meter 32, for example, by reducing the possibility of multiple seeds being deposited in the same location (e.g., a multiple) or a seed not being planted in a desired location (e.g., a skip), operation of the seed meter 32 according to one suitable protocol enables the seeds to be planted at desired locations. Operation of the seed meter 32 according to another suitable protocol enables a multi-variety seed meter to switch seed varieties flowing through the same seed meter on the fly by shutting off the first variety of seed for a very minimal duration of time before switching to the successive seed variety to be planted in order to minimize mixing of seed varieties being dispensed. However, implementation of the protocol in each case demands a way of sensing in real time a reliable indication of the dispensing status of the seed meter 32. Accordingly, the present invention addresses such needs, among others.

Figure 3:
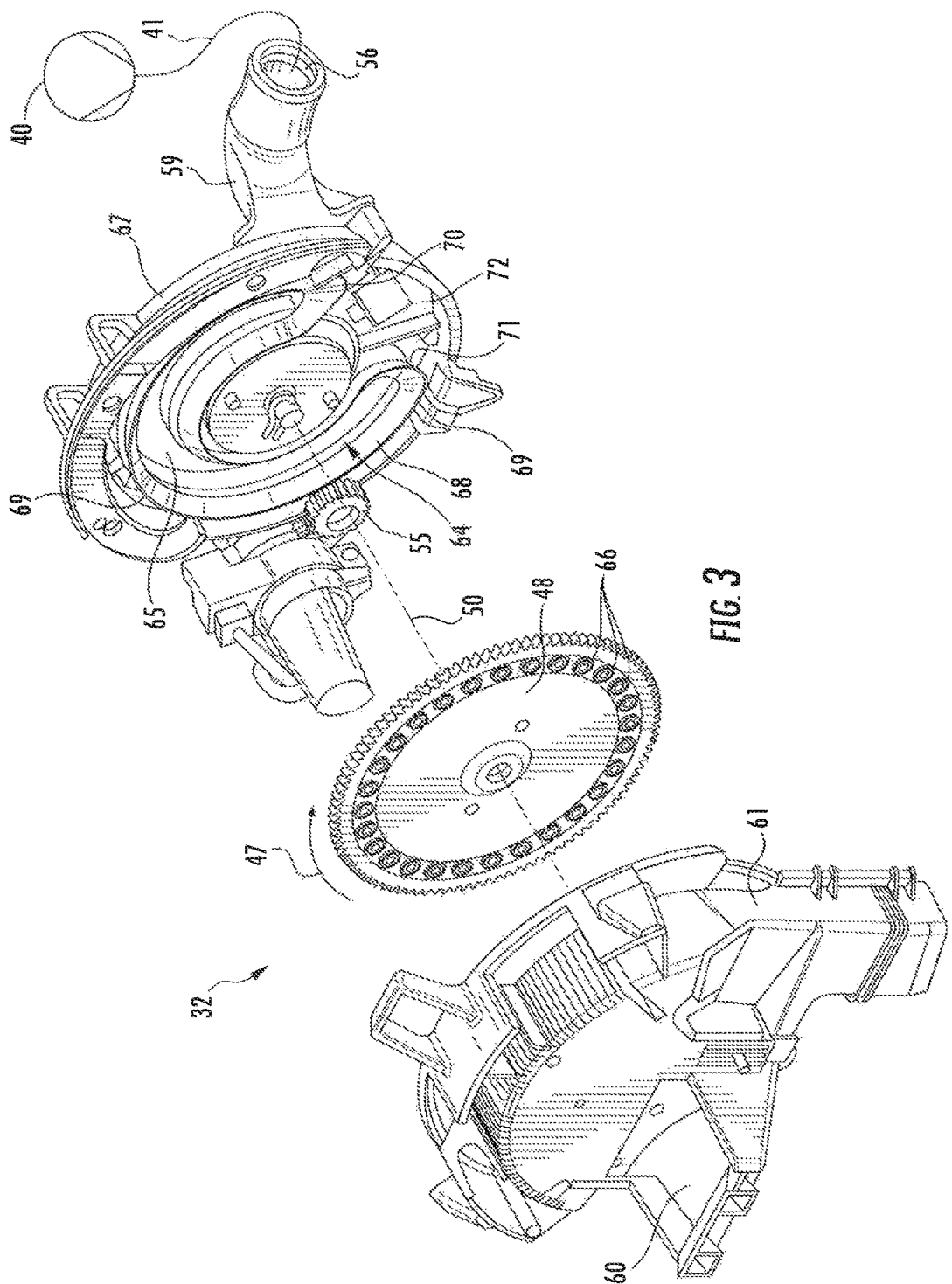
FIG. 3 provides a perspective view in a partially disassembled condition of an embodiment of a seed meter of a row unit on the planting implement of FIG. 1.
Figure 4:
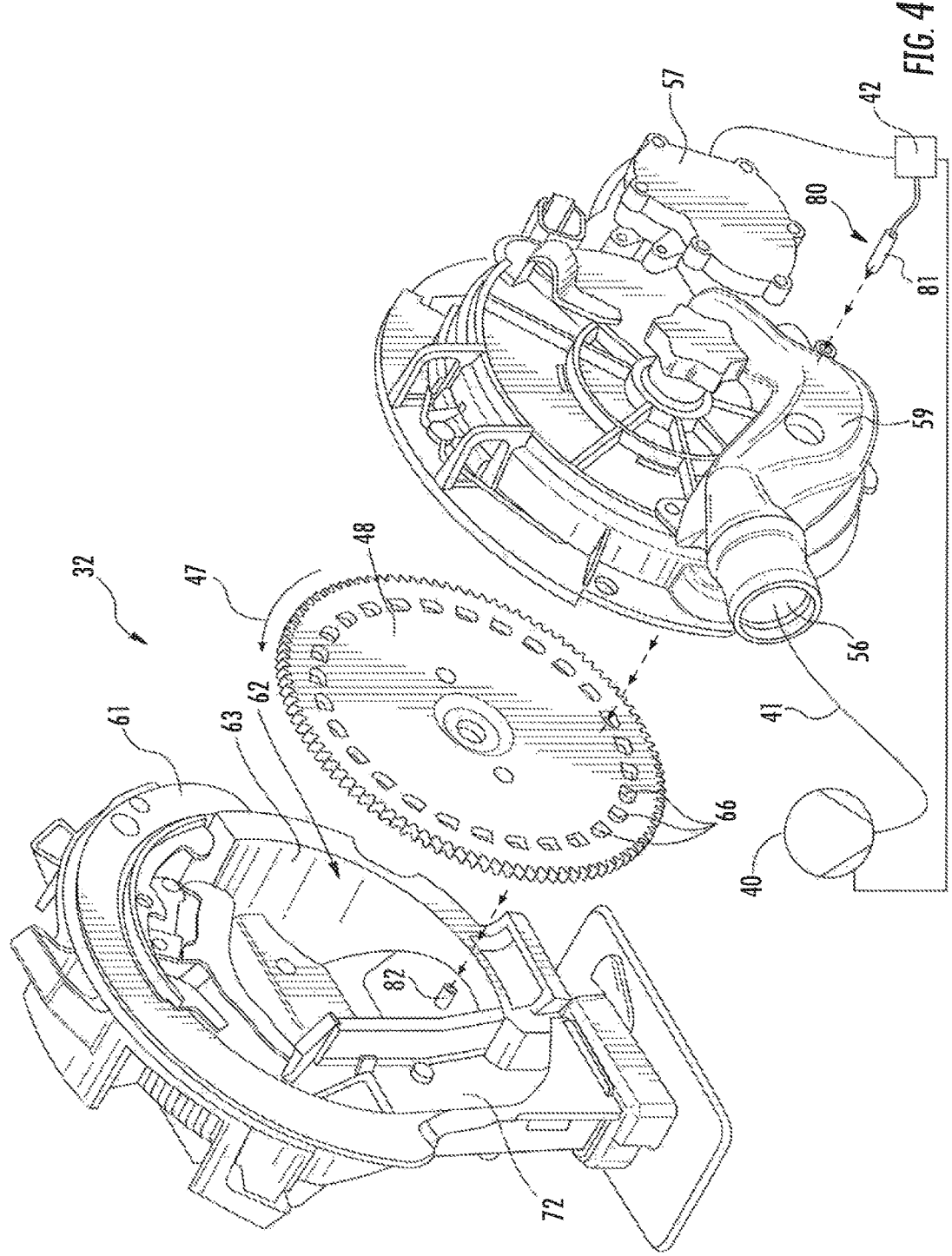
FIG. 4 provides a perspective view from the opposite end of the view shown in FIG. 3 of the partially disassembled condition of an embodiment of a seed meter of a row unit on the planting implement of FIG. 1.

As schematically shown in FIGS. 2, 3 and 4 for example, an embodiment of the seed meter 32 may be connected to a vacuum source 40 via a vacuum conduit that is schematically designated by the numeral 41 in FIGS. 3 and 4. As schematically shown in FIGS. 2 and 4 for example, the operation of the seed meter 32, and particularly the vacuum source 40, is controlled by a control unit 42, which desirably can include a processor 44 and a memory device 46. In some embodiments, the processor 44 may include one or more general purpose processors, one or more application specific integrated circuits, one or more field programmable gate arrays, or the like. Additionally, the memory device 46 may include any tangible, non-transitory, computer readable medium that is capable of storing instructions executable by the processor 44 and/or data that may be processed by the processor 44. In other words, the memory 46 may include volatile memory, such as random access memory, or non-volatile memory, such as hard disc drives, read only memory, optical discs, flash memory, and the like.

Basic components and operation of a vacuum seed meter are described in some detail in U.S. Pat. No. 9,426,940, which is hereby incorporated herein by this reference for all purposes. However, only those components playing a role in the understanding of the present invention will be described herein in any detail.

Figure 10:
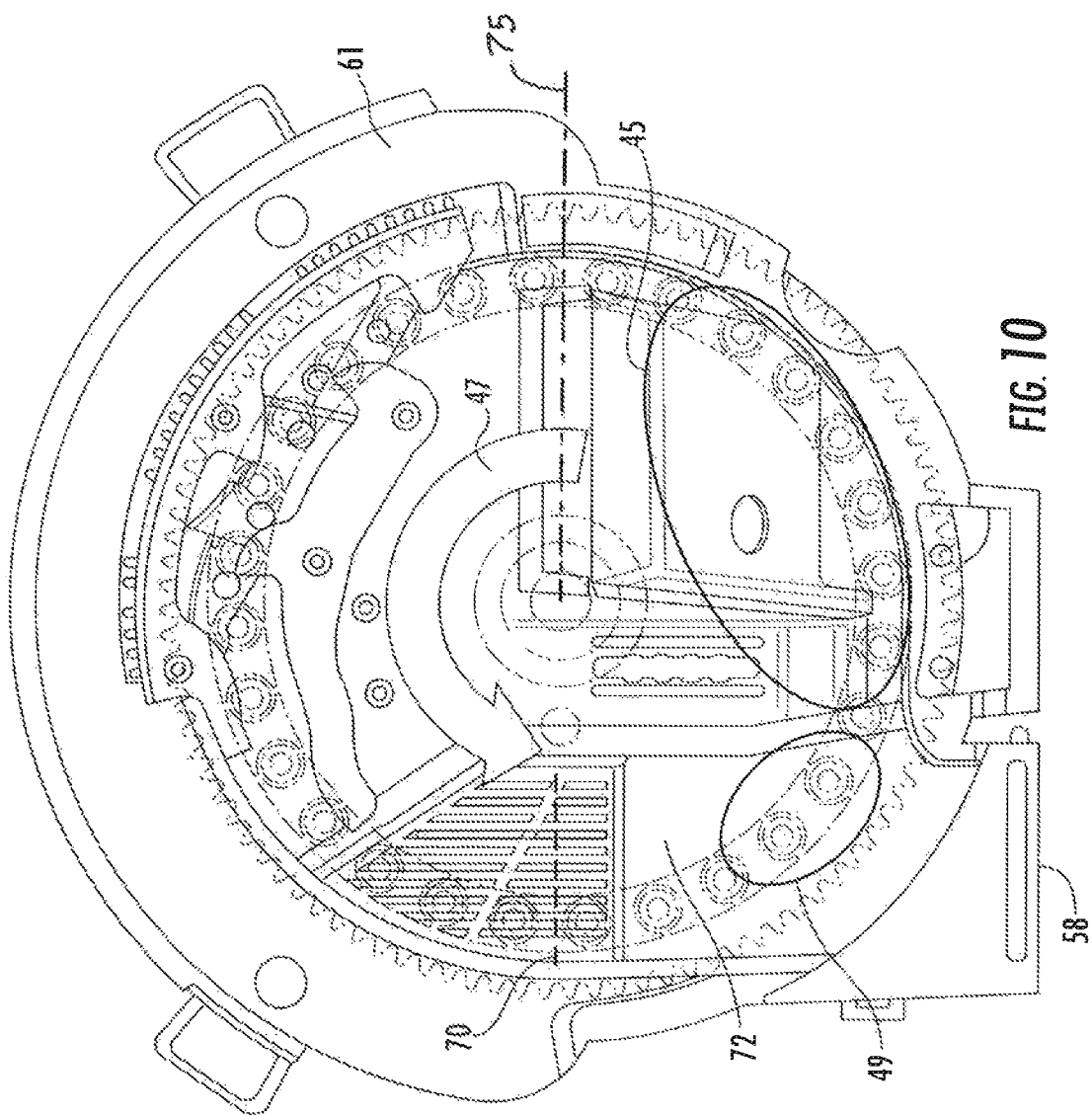
FIG. 10 provides a schematic representation of a side view of another embodiment of a seed disc of an embodiment of a seed meter for a row unit on the planting implement of FIG. 1 with some components shown in phantom by chain dashed lines.

The seed meter 32 generally includes an exterior housing that in a disassembled state depicted in FIGS. 3 and 4 desirably includes a seed cover assembly 61 disposed in opposition to a mechanical housing assembly 67. As shown in FIG. 3 for example, the seed meter 32 also generally includes a seed disc 48 that is disposed between the seed cover assembly 61 and the mechanical housing assembly 67. The seed disc 48 is carried by the housing about a central axis of rotation schematically designated by the chain dashed line designated by the numeral 50 in FIG. 3. As shown in FIG. 10 for example, this rotational axis 50 of the seed disc 48 also runs through the horizontal centerplane 75 of the seed chamber 62. The outer edge of the seed disc 48 can be configured to engage and be driven by a drive sprocket 55 that is rotatably driven in turn by a motor 57 (FIG. 4) that can be operatively connected and controlled by the controller 42 to effect rotation of the seed disc 48 within the housing about the central axis 50.

As shown in FIG. 4 for example, the seed cover assembly 61 includes a seed chamber wall 63, and a seed chamber 62 is at least partially defined by the seed chamber wall 63 and the seed disc 48. As shown in FIG. 3 for example, the mechanical housing assembly 67 includes a vacuum channel wall 65, and a vacuum channel 64 is at least partially defined by the vacuum channel wall 65 and the seed disc 48. The seed disc 48 that is rotatably carried by the housing is disposed between the seed chamber wall 63 and the vacuum channel wall 65. The seed disc 48 is spaced apart from the seed chamber wall 63 to define the seed chamber 62 between the seed disc 48 and the seed chamber wall 63. Thus, as shown in FIG. 4 for example, one of the opposite sides of the seed disc 48 faces into the seed chamber 62, while as shown in FIG. 4 for example, the opposite side of the seed disc 48 faces into the vacuum channel 64.

Figure 7:
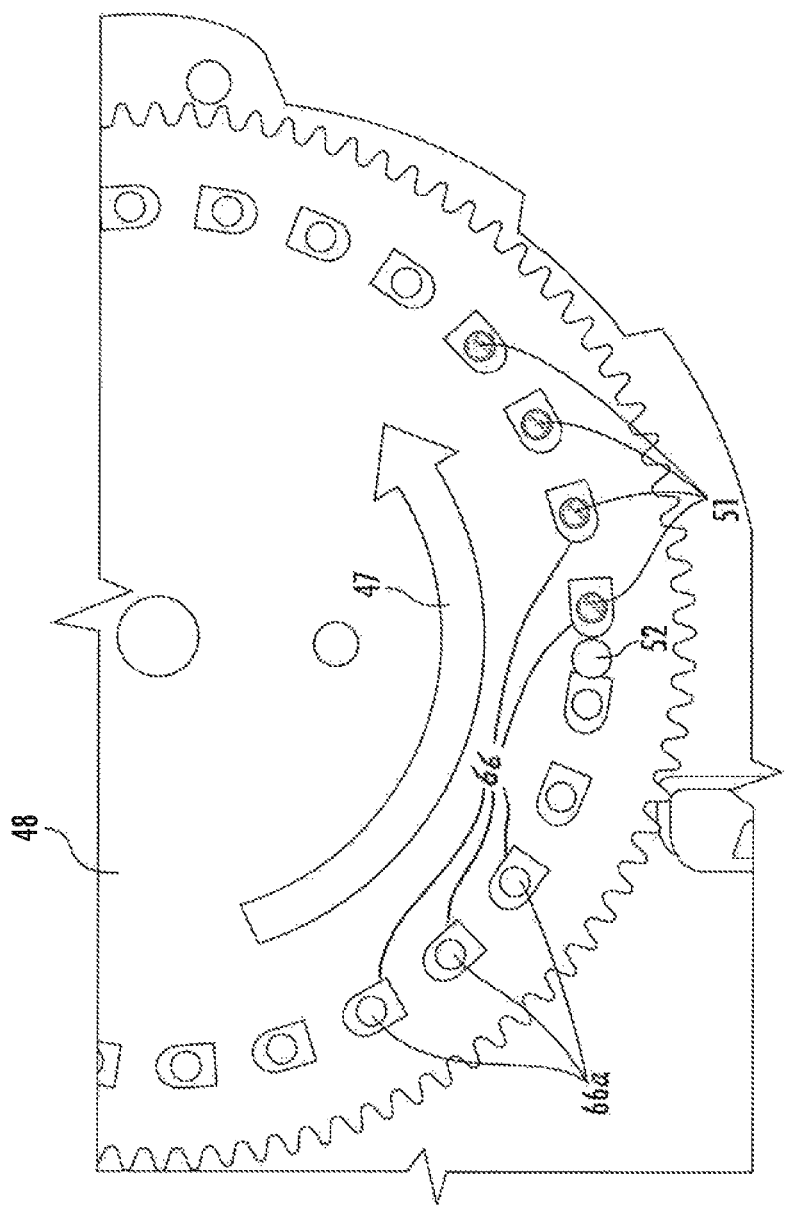
FIG. 7 provides a schematic representation of a side view of an embodiment of the lower portion of a seed disc of an embodiment of a seed meter for a row unit on the planting implement of FIG. 1.

As shown in FIG. 7 for example, multiple seed cells 66 are defined around a perimeter region of the seed disc 48. Each seed cell 66 includes an opening 66a through the seed disc 48. Moreover, in one side of the seed disc 48, each opening 66a of each seed cell 66 desirably can be variously configured depending on the type of seed that the seed disc 48 is intended to dispense. In most embodiments, each seed cell 66 is configured to carry a single seed of a particular type of seed. In multi-seed embodiments, each seed cell 66 is configured to carry more than a single seed of a particular type of seed or multiple varieties of seed. The seed cells 66 are spaced uniformly apart from each other around the perimeter of the seed disc 48 so that constant rotation of the seed disc 48 results in a commensurately constant rate at which a seed cell 66 passes a given fixed point of the housing of the seed meter 32.

The seed disc 48 is spaced axially apart (in the direction along the central axis of rotation 50) from the vacuum channel wall 65. As shown in FIG. 3, a sealing gasket 68 desirably is disposed between the vacuum channel wall 65 and the seed disc 48 and defines a sealing edge 69 that seals against the face of the seed disc 48 disposed toward the vacuum channel wall 65 when the seed meter 32 is fully assembled. Thus, the seed disc 48, the vacuum channel wall 65 and the sealing gasket 68 combine to define the vacuum channel 64 that extends continuously about three quarters of the way around the circumference of the seed disc 48. Moreover, as shown in FIG. 3 for example, the vacuum channel 64 is configured and confined to be coincident with the perimeter portion of the seed disc 48 in which the seed cells 66 are defined. Accordingly, at any given time when the vacuum source 40 is being operated to impose a negative pressure inside the vacuum channel 64, about one quarter of the seed disc 48 is not subjected to the negative pressure established within the seed chamber 62 while the remaining three quarters of the seed disc 48 is subjected to the vacuum force of the vacuum source 40.

In operation, the seed meter 32 receives seeds from the seed hopper 30 (FIG. 2). The seeds are provided via the seed input port 60 shown in FIG. 3 for example and become stored in the seed chamber 62 of the seed meter 32. As schematically shown in FIGS. 3 and 4 for example, the vacuum source 40, which is coupled to a vacuum port 56 formed at one end of a vacuum manifold 59 that is connected to the mechanical housing assembly 67, desirably is used to output seeds from the seed meter 32. As schematically shown in FIGS. 3 and 4 for example, the vacuum port 56 is coupled via vacuum manifold 59 the to the vacuum channel 64, which is accordingly maintained at the negative pressure imposed by the vacuum source 40 and accordingly subjects the seed cells 66 passing over the vacuum channel 64 to this same negative pressure. In some embodiments, the vacuum source 40 may create a negative pressure (e.g., a pressure lower than atmospheric pressure) in the vacuum channel 64, which causes seeds from the seed chamber 62 to attach to the seed cell openings 66 that are formed through the perimeter of the seed disc 48 as schematically shown in FIG. 7 for example. In other embodiments, a positive pressure (e.g., a pressure higher than atmospheric pressure) would be established in the seed chamber 62 on the side of the seed disc 48 to push the seeds into the seed cell openings 66 in the seed disc 48.

As schematically shown in FIG. 7 for example, the seeds 51 may become attached to and rotate with the seed disc 48 as the perimeter region of the seed disc 48 in which the seed cells 66 are defined rotates through the seed chamber 62 where the vacuum channel 64 is disposed to the opposite side of the seed disc 48 shown in FIG. 7. As schematically shown in FIG. 10 for example, the larger oval designated 45 generally surrounds and designates the loading zone region 45 of the seed meter 32. In this loading zone region 45, seeds 51 from the seed chamber 62 become positioned within respective seed cells 66 as shown in FIG. 7 and described above. The vacuum sucks the seeds 51 stored in the seed chamber 62 into the seed cells 66 on the side of the seed disc 48 that faces into the seed chamber 62 and shown in FIG. 7.

As the seed disc 48 rotates out of the store of seeds in the seed chamber 62 and in the direction of the disc rotation arrow 47 schematically shown in FIGS. 3, 4, 7 and 10 for example, each seed cell 66 remains under the influence of the vacuum channel 64 and is configured to carry its load (e.g., a single seed 51 in the embodiment of FIG. 7) out of the seed chamber 62 and toward a drop zone region 72 (FIGS. 3 and 10) of the seed meter 32. As the seed disc 48 rotates, the seed cells 66 eventually move past the distal end 70 (FIG. 3) of the vacuum channel 64. The position of the distal end 70 of the vacuum channel 64 is also schematically shown by the horizontal dashed line in FIG. 10. Once past the distal end 70 of the vacuum channel 64, the seed cells 66 no longer feel the vacuum being applied to the seed disc 48, and so each seed cell 66 that rotates past the distal end 70 of the vacuum channel 64 exposes the seeds therein to ambient pressure on both sides of the seed cell 66, thereby allowing gravity to release them from the seed cells 66 and fall from the seed disc 48.

As shown in FIG. 3 for example, the region of the seed meter 32 under ambient atmosphere is disposed between the distal end 70 of the vacuum channel 64 and the proximal end 71 of the vacuum channel 64 and is the drop zone region 72 of the seed meter 32. As schematically shown in FIG. 10 for example, the drop zone region 72, which is beyond the effective influence of the vacuum source 40, is formed and disposed vertically above the seed output port 58 of the seed meter 32. Absent the vacuum force holding the seeds 51 within the seed cells 66 as depicted in FIG. 7, the rotation of the seed disc 48 within the drop zone region 72 releases the seeds from the seed cells 66 in this drop zone region 72 and allows the seeds to drop through the seed output port 58 and into a mechanism for seed delivery such as a seed tube 34. Other types of seed delivery mechanisms such as a belt delivery system may be included in a row unit 20.

Once the seeds are released from the seed disc 48 in the drop zone region 72 of the seed meter 32, the seeds fall under the influence of gravity through the seed output port 58 and into the entrance of the seed tube 34 (FIG. 2). As schematically shown in FIG. 10 for example, the smaller oval designated 49 generally surrounds and designates the region of the seed meter 32 where the seed cells 66 already have passed through most of the drop zone region 72 of the seed meter 32 and should be empty of seeds in the normal operation of the seed meter 32. Thus, seed detection in this so-called empty zone region 49 of the seed meter 32 can indicate faulty operation of the seed meter 32.

In one embodiment, the seed meter 32 desirably includes a first sensor that detects the presence of a seed within a seed cell 66 that passes through the detection zone of the particular first sensor. As schematically shown in FIG. 4 for example, this first sensor 80 is often termed the seed pool sensor 80. Desirably, as schematically indicated in FIG. 7 by the circled area designated by the numeral 52, the detection zone of this seed pool sensor 80 is aimed at the loading zone region 45 of the seed meter 32 and specifically at the region of the seed disc 48 that passes through the relatively lowest region of the seed chamber 62. The seed chamber 62 defines a bottom such that seeds 51 tend to move toward the bottom due to the influence of gravity, and the perimeter region of the seed disc that rotates within the seed chamber 62 closest to the bottom thereof is the portion of the seed disc 48 that is moving through the loading zone region 45 of the seed meter 32.

As the seed disc 48 is rotating through the seed chamber 62, each individual seed cell 66 can be said to be orbiting about the central axis of rotation 50. Continuing the planetary orbital metaphor, a so-called perigee location is arbitrarily defined as the location within the seed chamber 62 a seed cell 66 most closely approaches the absolute bottom of the seed chamber 62. At some particular moment during each complete orbit of a single seed cell 66 in the rotating seed disc 48, that seed cell 66 will pass through the perigee location 52 within the seed chamber 62. Accordingly, the detection zone region 52 shown in FIG. 7 can be said to define the perigee location of the passage of seed cells 66 through the seed chamber 62.

The seed pool sensor 80 is disposed so that it is aimed at a targeting region within the seed chamber 62. The precise location of this targeting region within the seed chamber 62 can be varied. However, as schematically shown in FIG. 10 for example, desirably the targeting region will be located somewhere beneath the horizontal centerplane 75 of the seed chamber 62. Possible targeting regions for a seed pool sensor 80 near the bottom of an embodiment of a seed chamber 62 are illustrated in FIG. 7 as follows. When a first seed cell 66 is positioned at the perigee location 52 schematically indicated in FIG. 7, there will be a second seed cell 66 immediately adjacent in the clockwise direction from the first seed cell 66 and a third seed cell 66 immediately adjacent in the counterclockwise direction from the first seed cell 66. While the clocking angle between adjacent seed cells 66 will vary depending on the particular seed disc 48, each of the locations of this group of three seed cells 66 near the bottom of the seed chamber 62 is believed to be one of three possible desirable targeting regions for the aim of the seed pool sensor 80 for a given embodiment of a seed disc 48. The aim of the seed pool sensor 80 might in some embodiments be directed so as to target the seed cell 66 that passes closest to the bottom of the seed chamber 62. Alternatively, the aim of the seed pool sensor 80 might in some embodiments be directed so as to target the seed cell 66 immediately adjacent in the clockwise direction to the seed cell 66 that passes closest to the bottom of the seed chamber 62. Alternatively, the aim of the seed pool sensor 80 might in some embodiments be directed so as to target the seed cell 66 immediately adjacent in the counterclockwise direction to the seed cell 66 that passes closest to the bottom of the seed chamber 62.

In alternative embodiments, the seed meter 32 desirably also includes a second sensor that detects the absence of any seed within a seed cell 66 that passes through the empty zone region 49 of the seed meter 32 where a vacant seed cell 66 is expected. This empty zone region 49 of the seed meter 32 is where the perimeter region of the seed disc 48 containing the seed cells 66 rotates outside of the influence of the vacuum channel 64.

In accordance with one aspect of the present invention, a first sensor is carried by the housing and aimed at the perimeter region of the seed disc 48 where the seed cells 66 are defined. Referring to FIG. 7 for example, the target area designated within the circle labeled 52 is indicative of the region of the perimeter of the seed disc 48 that would be sensed by a detection signal triggered from the emitter of a first sensor 80, which desirably is disposed in the vacuum channel 64. So disposed, the first sensor 80 is able to target passage of the seed cells 66 as the seed disc 48 rotates within the housing through the loading zone region 45 of the seed meter 32. Desirably, the first sensor 80 is disposed in the vacuum channel 64 and desirably carried by the vacuum wall 65 and embedded therein with exposure into the vacuum channel 64. Due to the constant high velocity air passing through the vacuum channel 64, dust cannot build up to any significant degree on the interior surface of the vacuum channel 64 or on the sensor 80 disposed therein.

As schematically shown in FIG. 7, the detection zone 52 of this first sensor 80 schematically shown in FIGS. 4, 6, 11 and 12 for example, desirably is aimed specifically at the seed cells 66 located in the region of the seed disc 48 that passes through the relatively lowest region of the seed chamber 62. Once the seed cells 66 in this detection zone 52 start to become starved of seeds, then the seed meter 32 might possibly have become almost empty of seeds. Accordingly, the signal received by the first sensor 80 can be provided to the controller 42 to indicate when the seed meter 32 is about to be starved of seed. Similarly, the signal received by the first sensor 80 can be provided to the controller 42 to indicate when the seed meter 32 is about to be starved of a first variety of seed before the controller 42 switches the seed meter 32 to dispense a second variety of seed. In each case, the controller 42 can be preprogrammed to determine when the seed chamber 62 has become empty by for example counting a predetermined number of empty seed cells 66 in this detection zone 52 for a predetermined number of seed cells 66 that pass through this detection zone 52. As an example, if in a sample of 20 seed cells 66 passing through the detection zone 52, the first sensor 80 receives detection signals indicative of empty seed cells 66 in 8 of the passing seed cells 66, the controller 42 is preprogrammed to implement procedures intended to respond to a condition of the seed chamber 62 starved of seeds. For example, the controller 42 can be preprogrammed to switch the seed meter 32 to dispense a second variety of seed or refill the seed chamber 62 from the seed hopper 30 with additional seed of the same variety.

Figure 11:
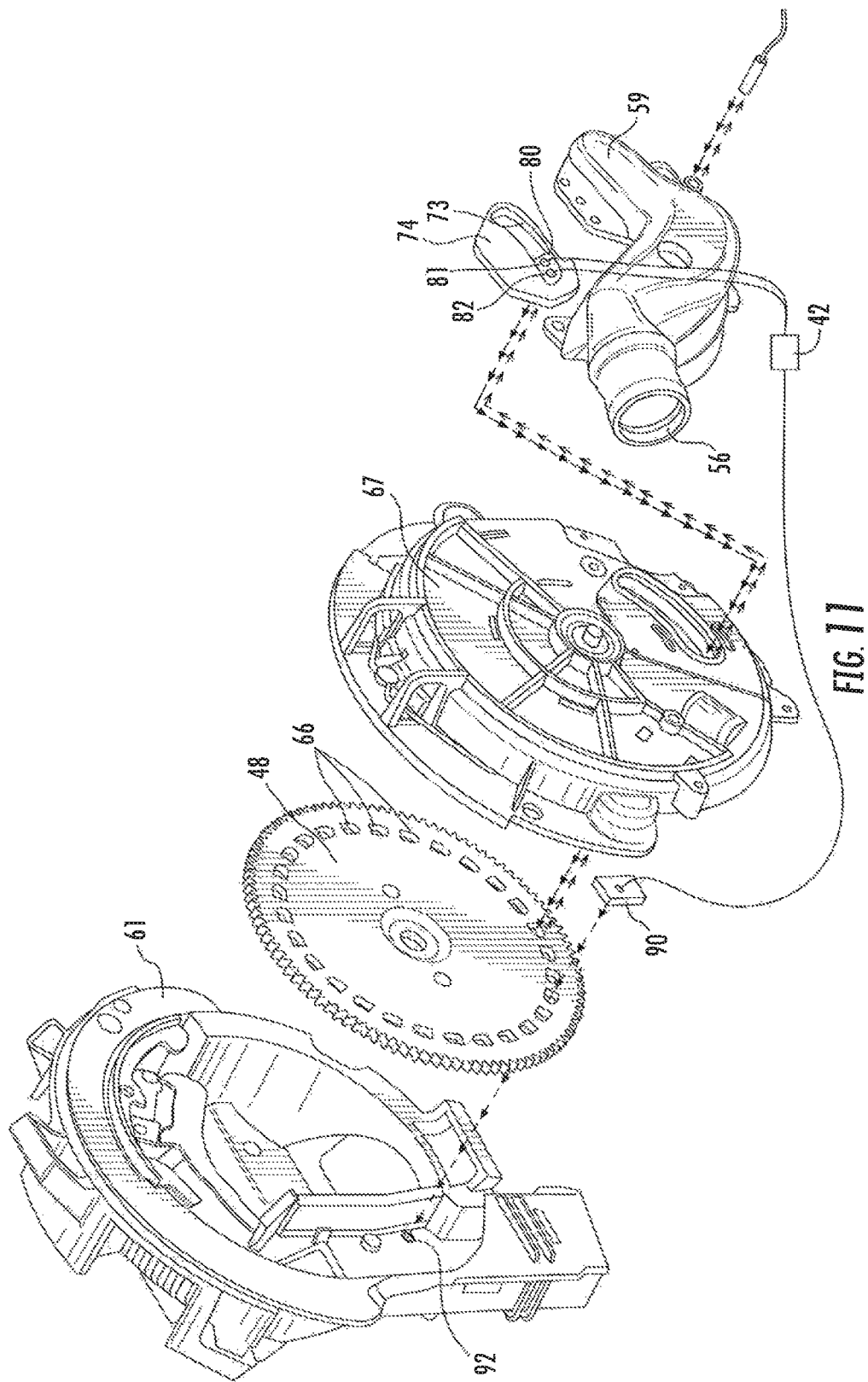
FIG. 11 provides a perspective view in a partially disassembled condition of another embodiment of a seed meter of a row unit on the planting implement of FIG. 1.
Figure 12:
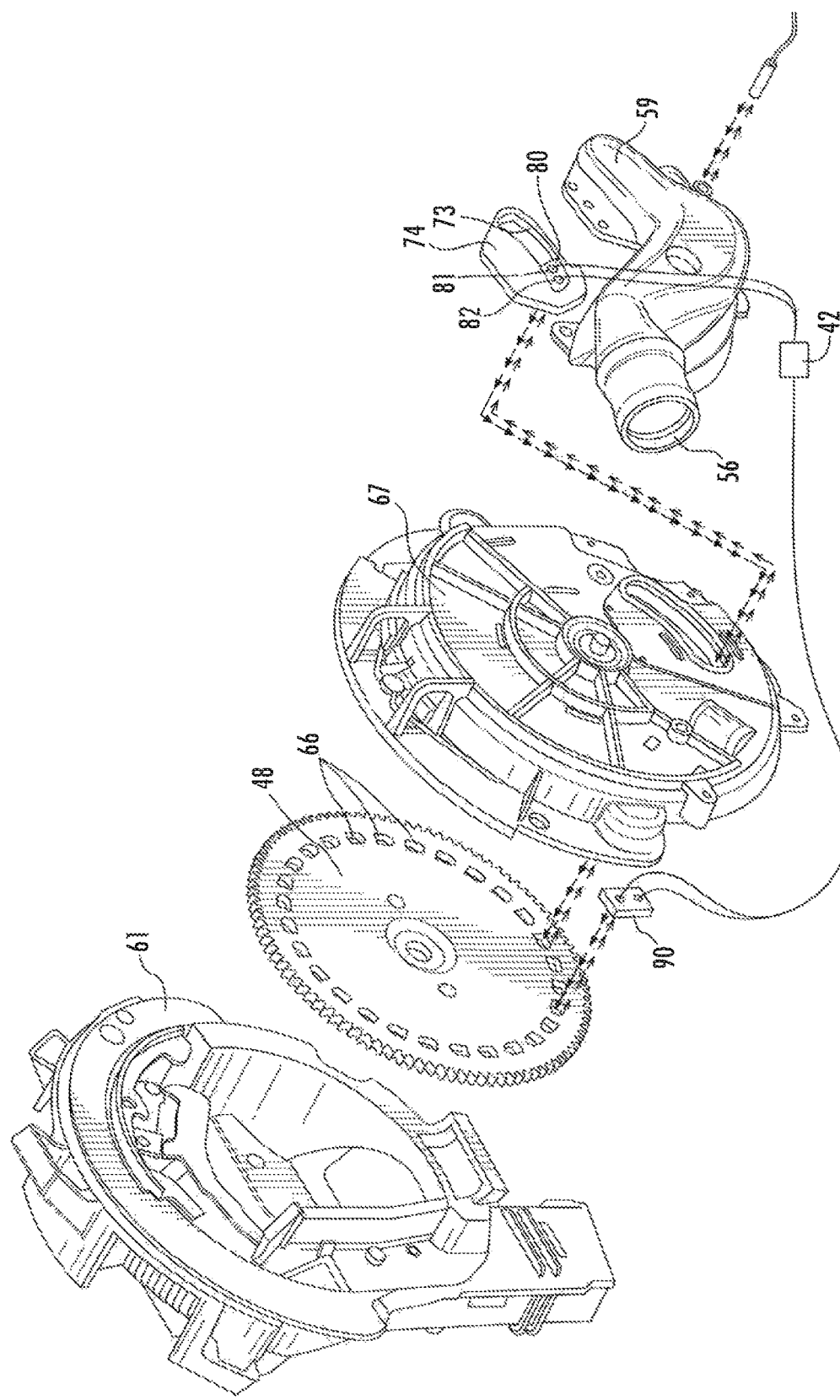
FIG. 12 provides a perspective view in a partially disassembled condition of another embodiment of a seed meter of a row unit on the planting implement of FIG. 1.

The first sensor 80 can be an optical sensor. One example of an optical sensor is one that emits a narrowly focused beam in the infrared region of the electromagnetic spectrum. In the embodiment schematically depicted in FIG. 4 for example, the first sensor 80 is a break beam sensor, which requires a receiving element 82 on one side of the seed disc 48 and an emitter 81 on the opposite side of the seed disc 48. While in the embodiments depicted in FIGS. 6, 11 and 12 for example, the first sensor 80 is a reflectance sensor that combines the emitter 81 and receiver 82 disposed to only one side of the seed disc 48. As shown in FIGS. 11 and 12 for example, one desirable embodiment of the first sensor 80 is a module that includes an emitter 81 and a receiver 82 and is held and carried at one end of the arcuate opening 73 defined through a flat planar housing 74 that is bolted in place between the mechanical housing assembly 67 and the vacuum manifold 59. Other types of sensors could be employed in other embodiments, and for example the first sensor 80 could be a capacitive proximity sensor.

Figure 6:
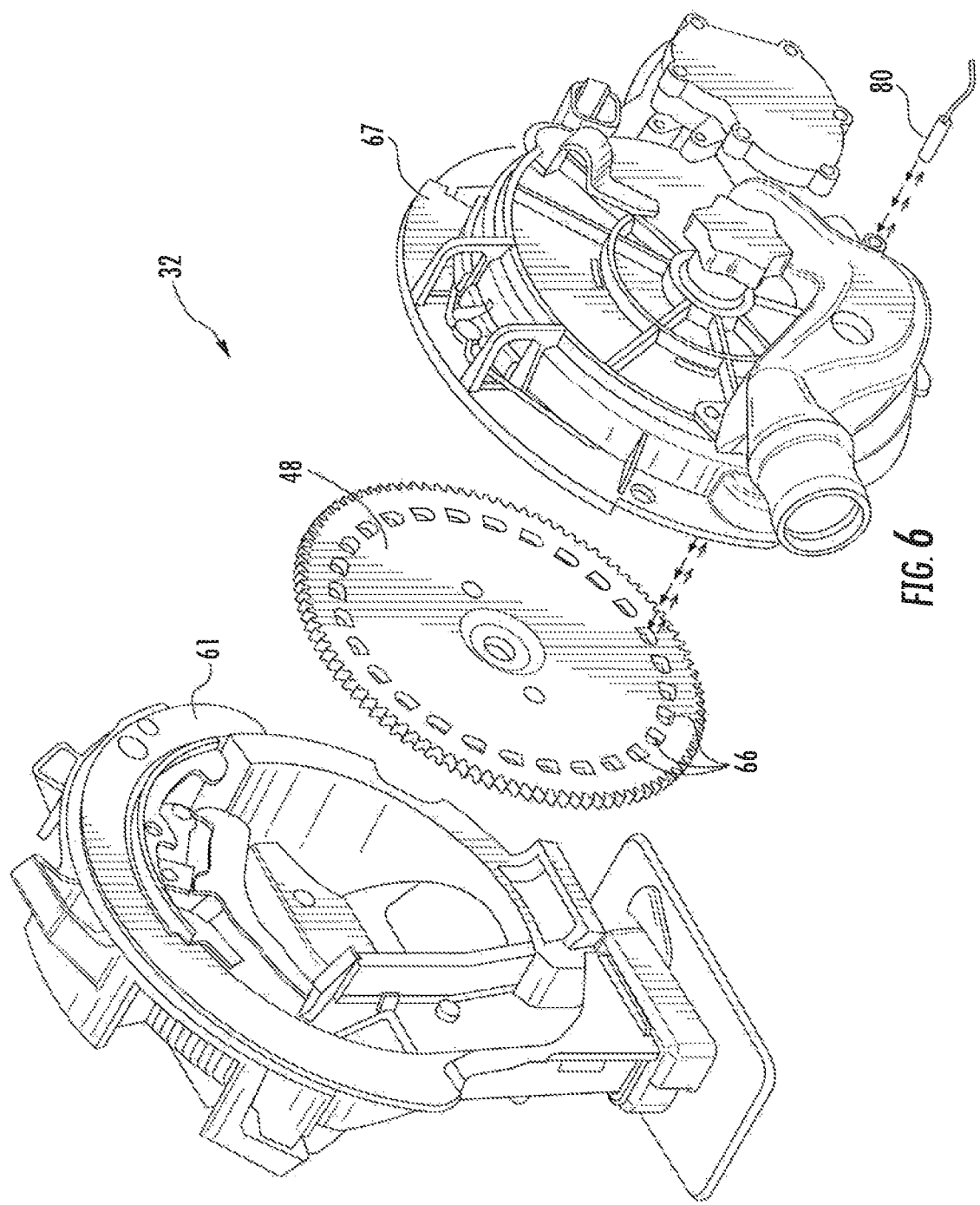
FIG. 6 provides a perspective view in a partially disassembled condition of another embodiment of a seed meter of a row unit on the planting implement of FIG. 1.

The detection signal emitted by the first sensor 80 is schematically represented in FIGS. 4, 6, 11 and 12 by the dashed lines with the arrows pointing in the direction from the first sensor 80 at the right side of the figure toward the seed disc 48. The detection signal received by the first sensor 80 is schematically represented in FIG. 4 by the dashed lines with the arrows pointing in the direction from the seed disc 48 toward the receiving element 82 of the first sensor 80 at the seed cover assembly 61 of the housing of the seed meter 32. Similarly, the detection signal received by the first sensor 80 is schematically represented in FIGS. 6, 11 and 12 by the dashed lines with the arrows pointing in the direction from the seed disc 48 toward the first sensor 80 at the right side of the figure.

Figure 5:
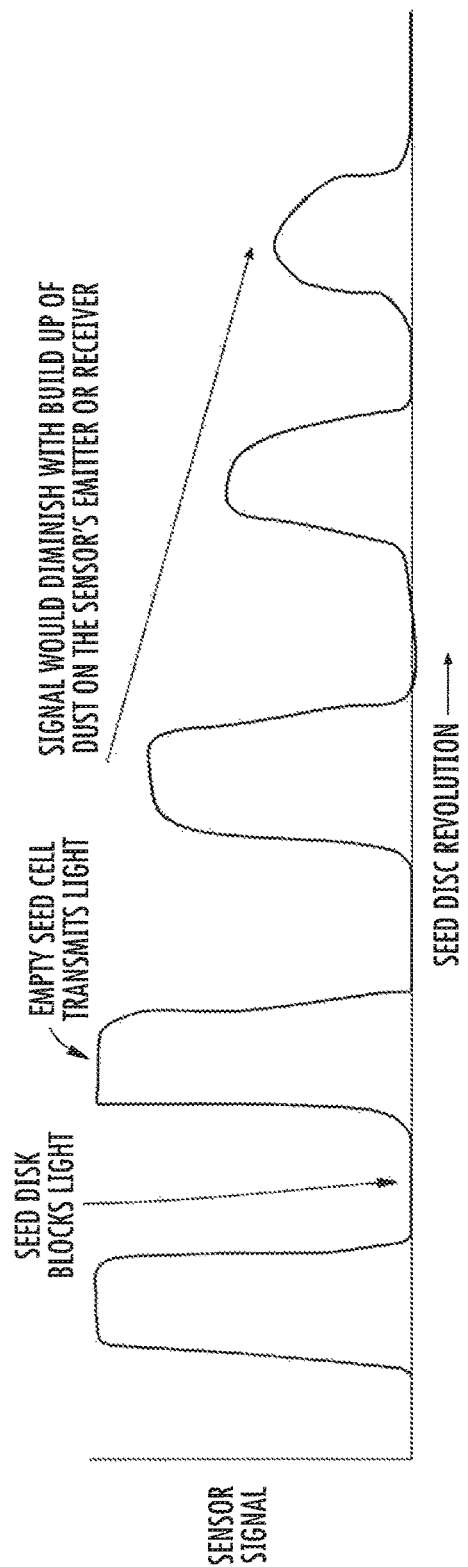
FIG. 5 provides a graphic representation of the relationship between the revolving seed disc of a seed meter as recorded by the signal of a break beam style sensor in accordance with an embodiment of the present invention.

FIG. 5 schematically represents the different types of signals that are transmitted from the first sensor 80 to the controller 42 as a consequence of the sensor's emission of a detection signal in the target region 52 (FIG. 7) of the seed disc 48. FIG. 5 schematically represents these different types of transmission signals from a break beam style infrared optical sensor in a clean environment versus an environment in which there has been an accumulation of dust on the emitter 81 or receiver 82 of the first sensor 80. The two signals on the left hand side of FIG. 5 are representative of the types of signals that are transmitted from the first sensor 80 to the controller 42 when the first sensor 80 exists in the clean condition of the sensor. While the three signals to the viewer's right in FIG. 5 are representative of the types of signals that are transmitted from the first sensor 80 to the controller 42 when the sensor 80 is soiled to varying degrees. The signal farthest to the right in FIG. 5 represents a greater degree of soiling than the other two signals to the right in FIG. 5. Note that while the magnitude of the transmitted signal differs depending on the degree of soiling, the period of the signal remains the same. That is, the time duration between expected signals remains constant. Thus, as long as a signal of some magnitude is transmitted at the expected interval, the effects of soiling can be taken into account in some manner by an algorithm used by the controller 42.

Figure 8:
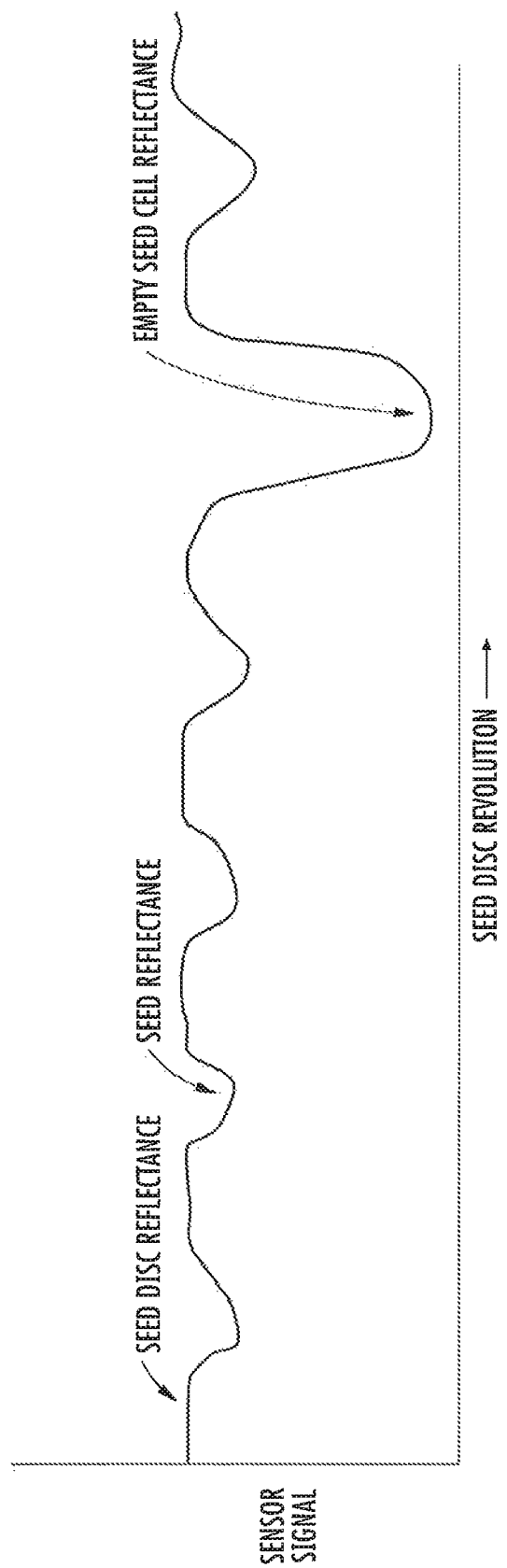
FIG. 8 provides a graphic representation of the relationship between the revolving seed disc of a seed meter as recorded by the signal of a reflectance style sensor in accordance with an embodiment of the present invention when the seed disc has a higher reflectance than the reflectance of the seed being deposited.

Referring to FIG. 7 for example, the target area designated within the circle labeled 52 is indicative of the region of the perimeter of the seed disc 48 that would be sensed by a detection signal triggered from the emitter of a first sensor 80, which may be a reflectance style infrared sensor for example. FIG. 8 schematically represents the magnitude of the signal reflected from the target area 52 of the seed disc 48 when the surface of the seed disc 48 has a higher reflectance than the surface of the seed. At the left side of FIG. 8, the difference between the magnitude of the reflected signal from the surface of the seed disc 48 relative to the magnitude of the reflected signal from the surface of a seed contained within an individual seed cell 66 at that target area 52 of the seed disc 48 is apparent. At the right side of FIG. 8, the greatly diminished magnitude of the signal received from reflectance at an empty seed cell 66 at the target area 52 on the perimeter of the seed disc 48 can be compared to the magnitude of the signal received from reflectance from the surface of the seed disc 48 and the magnitude of the signal received from reflectance from the seed within a seed cell 66 located at the target area 52.

Figure 9:
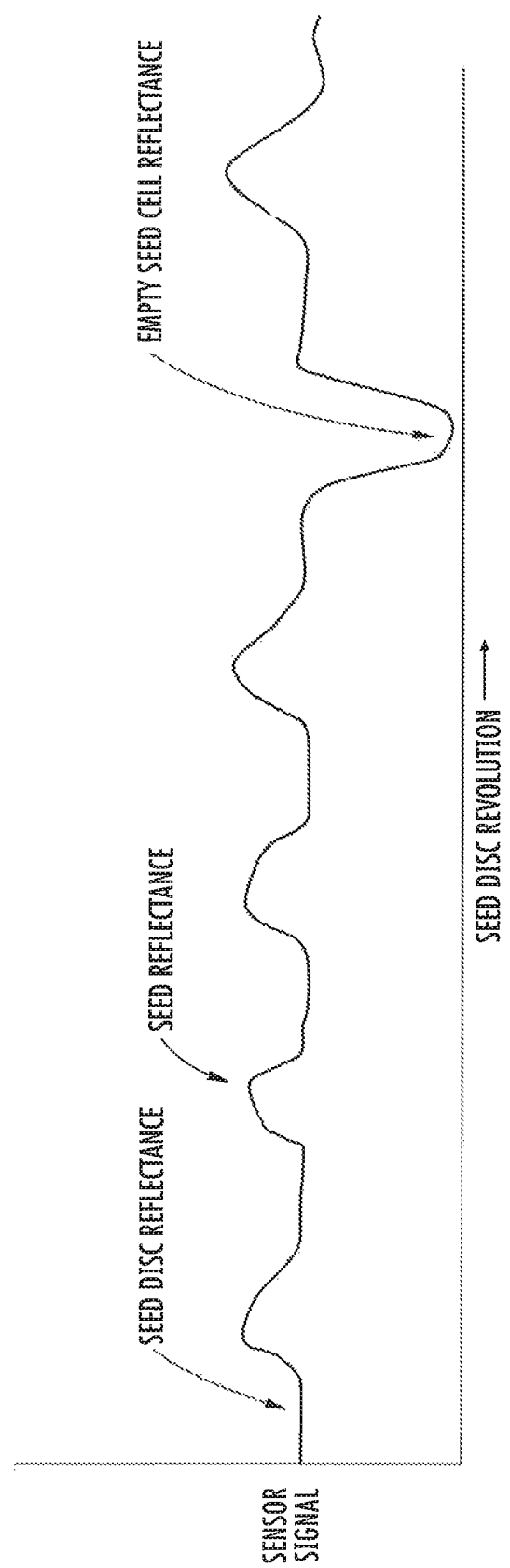
FIG. 9 provides a graphic representation of the relationship between the revolving seed disc of a seed meter as recorded by the signal of a reflectance style sensor in accordance with an embodiment of the present invention when the seed disc has a lower reflectance than the reflectance of the seed being deposited.

FIG. 9 schematically represents the magnitude of the signal detected at the target area 52 of the seed disc 48 when the surface of the seed disc 48 has a lower reflectance than the surface of the seed. The left side of FIG. 9 schematically illustrates the difference between the signal detected by reflectance from the surface of the seed disc 48 relative to reflectance from a seed contained within an individual seed cell 66 at that target area 52 of the seed disc 48. At the right side of FIG. 9, the greatly diminished signal received from reflectance at an empty seed cell 66 at the target area 52 on the perimeter of the seed disc 48 can be compared to the magnitude of the signal generated due to reflectance from the surface of the seed disc 48 and to the magnitude of the signal generated due to reflectance from the seed being carried within a seed cell 66.

In accordance with one aspect of the present invention, the controller 42 can be preprogrammed with algorithms that differentiate between the anticipated patterns of the magnitude of the signals that are transmitted from the first sensor 80 to the controller 42 and correspond to the anticipated spacing between adjacent seed cells 66. The signal received by the first sensor 80 can be provided to the controller 42 to indicate when the seed cells 66 of the seed meter 32 are being starved of seed. Referring to FIG. 7 for example, because of the targeting location of the detection zone 52 of the seed pool sensor 80, though the sensor 80 may detect empty seed cells 66 on the seed disc 48, this condition of empty seed cells 66 at the detection zone 52 does not necessarily equate to an empty seed pool in the seed chamber 62. It might merely indicate a failure of one or more seed cells 66 to acquire a seed 51, and thus might indicate that the vacuum source 40 needs to generate greater negative pressure. As the seed disc 48 rotates past the detection zone 52, unless the seed chamber 62 is in fact starved of seeds, the empty seed cells 66 still have an opportunity to pick up seed 51 as the seed cells 66 continue to rotate through the seed pool that may exist within the seed chamber 62. Accordingly, when the seed pool sensor 80 detects empty seed cells 66, the controller 42 can be programmed to interpret such a condition as an indication that one or more operating parameters of the seed meter 32 needs to be adjusted so that the performance of the seed meter 32 is not hindered. Examples of such operating parameters include adjusting the vacuum level maintained by the vacuum source 40, adjustments to any seed baffle, adjustments to seed agitation, adjustments to the planting speed, adjustments to any seed gates whether opening or closing, adjustments to any fluted rollers provided for seed supply whether engaging or disengaging.

The signal received by the seed pool sensor 80 also can be provided to the controller 42 to indicate when the seed meter 32 is about to be starved of a first variety of seed before the controller 42 switches the seed meter 32 to dispense a second variety of seed or refills the seed chamber 62 from the hopper 30 with the same variety of seed. Additionally, the signal received by the seed pool sensor 80 also can be provided to the controller 42 to indicate when the seed meter 32 is being deprived of seed because of a malfunction upstream of the seed meter 32. Some examples of such upstream problems might include a plugged bulk fill hose, seed that is bridged in the hopper 30 and thus ceasing to flow, or a seed hopper 30 that has become fully depleted of seed.

In accordance with another aspect of the present invention, a second sensor 90 is carried by the housing and aimed at the perimeter region of the seed disc 48 where the seed cells 66 are defined. However, as schematically shown in FIGS. 11 and 12, this second sensor 90 desirably is aimed at the seed cells 66 in the perimeter region of the seed disc 48 that rotates outside of the vacuum channel 64 and outside of the seed chamber 62. Referring to FIG. 10 for example, this second sensor 90 desirably is aimed at the perimeter region of the seed disc 48 that passes through the empty zone region 49 of the seed meter 32 where a vacant seed cell 66 is expected and schematically shown in FIG. 10 within the smaller oval.

Moreover, as shown in FIGS. 1 and 12, this second sensor 90 desirably is carried by the mechanical housing assembly 67 and/or the seed cover assembly 61 outside of the vacuum channel 64 and outside of the seed chamber 62 and thus in the drop zone region 72 shown in FIG. 10. Because the seed cells 66 in the drop zone region 72 will be starved of seeds apart from the occasional stuck seed remnant, this second sensor 90 is not likely to be affected by soiling. Accordingly, the second sensor 90 will provide a relatively uniform and reliable signal that can be readily analyzed by the controller 42 to indicate when a seed cell 66 is passing through the detection zone of the second sensor 90.

In accordance with another aspect of the present invention, the relatively uniform and reliable signal provided by the second sensor 90 desirably can be used by the controller 42 as a timing signal for evaluating the detection signal being received by the first sensor 80. Thus, the second sensor 90 is conveniently termed the timing sensor 90. When the timing sensor 90 and the seed pool sensor 80 can be arranged in a configuration that permits a seed cell 66 to pass through the detection zone 52 of the seed pool sensor 80 (FIG. 7) in the seed chamber 62 at the same time that a different seed cell 66 is passing through the respective detection zone of the timing sensor 90 in the empty zone region 49 (FIG. 10) of the seed meter 32, then the controller 42 can be programmed to take a reading of the seed pool sensor 80 each time the timing sensor 90 detects a seed cell 66.

However, some embodiments of the seed meter 32 impose restrictions that render such precise arrangements of the relative disposition between the seed pool sensor 80 and the timing sensor 90 unsuitable, ill-advised, or superseded by other engineering considerations. Thus, in embodiments of the seed meter 32 subject to imprecise arrangements of the relative dispositions between the seed pool sensor 80 and the timing sensor 90, the controller 42 can be programmed to perform a running sampling of the signal being detected by the seed pool sensor 80 to determine if the signal passes a threshold that indicates an empty seed cell 66 rather than a compromised reading of the seed pool sensor 80 due to soiling or contamination for example. In such an embodiment, which presently is deemed to afford flexibility in design of the seed meter 32 for the reasons noted, the controller 42 can use the relatively uniform spacing of the signals received from the timing sensor 90 as a reset trigger to start evaluating the signal from the seed pool sensor 80 as each successive seed cell 66 is passing through the detection zone 52 of the seed pool sensor 80 as schematically shown in FIGS. 5, 8 and 9.

The controller can be preprogrammed to evaluate the detection signal being received by the seed pool sensor 80 only when a seed cell 66 is being addressed (passing through the detection zone 52) by the detection signal being emitted from the seed pool sensor 80. As schematically shown in FIG. 13 for example, a methodology can be employed according to one aspect of the present invention whereby the detection of the absence of a seed in the drop zone region 72 (FIG. 10) of the seed meter 32 by the timing sensor 90 is used by the controller 42 to coordinate the sampling of the detection signals by the seed pool sensor 80. Desirably, the timing sensor 90 will have its detection zone aimed in the empty region 49 (FIG. 10) of the seed meter 32. Employing the two separately directed sensors 80, 90 in this method, the controller 42 is preprogrammed to assume that the detection of an empty seed cell 66 by the timing sensor 90 occurs at the same time that the detection signal being emitted from the seed pool sensor 80 is addressing a seed cell 66 that is spaced farther forward along the perimeter of the seed disc 48 that is rotating in the direction indicated schematically by the arrow designated 47 in FIG. 10. In this way, the detection signal that is received from the seed pool sensor 80, which is disposed in the region of the seed meter 32 where there is likely to be an accumulation of seeds and a greater possibility of soiling, is only evaluated at a time when the detection signal received by the seed pool sensor 80 is indicative of the condition of the seed cell 66 rather than when the signal emitted by the seed pool sensor 80 is addressing the passage of a section of the seed disc 48 that does not contain a seed cell 66. Employing this signal sampling methodology enables the controller 42 to take action when the effects of soiling and varying degrees of reflectance from the seed disc 48 and the seeds, which have reflectance characteristics that may vary according to the type of seed being dispensed by the seed meter 32, are least likely to affect the operation of the seed pool sensor 80.

The detection signal emitted by the timing sensor 90 is schematically represented in FIGS. 11 and 12 by the dashed lines with the arrows pointing in the direction from the timing sensor 90 at the right side of the figure toward the seed disc 48. The detection signal received by the timing sensor 90 is schematically represented in FIG. 11 by the dashed lines with the arrows pointing in the direction from the seed disc 48 toward the receiving element 92 of the timing sensor 90 at the seed cover assembly 61 of the housing of the seed meter 32. Similarly, the detection signal received by the timing sensor 90 is schematically represented in FIG. 12 by the dashed lines with the arrows pointing in the direction from the seed disc 48 toward the timing sensor 90 at the right side of the figure.

Desirably, the pattern of signals detected by the timing sensor 90 can be used by the controller to determine the frequency with which the seed cells 66 pass a fixed point in the housing of the seed meter 32. In one embodiment, the controller 42 desirably can be preprogrammed to use this pattern of empty seed cells 66 detected by the timing sensor 90 to time the sampling of the detecting signals being received by the seed pool sensor 80 to determine whether one of the seed cells 66 is positioned at the detection zone 52 of the seed pool sensor 80 schematically shown in FIG. 7. Accordingly, the controller 42 desirably can be preprogrammed to examine the magnitude of the detection signal received by the seed pool sensor 80 as a return from the detection signal emitted by the seed pool sensor 80. The magnitude of this returned signal to the seed pool sensor 80 can be used to determine whether the seed cell 66 targeted by the detection signal of the seed pool sensor 80 has acquired a seed 51 as shown in FIG. 7 for example.

In an alternative embodiment, the controller 42 desirably can be preprogrammed to use this pattern of empty seed cells 66 detected by the timing sensor 90 in the empty region 49 (FIG. 10) of the seed meter 32 to evaluate the signal being generated from the seed pool sensor 80 at the time when the seed cell 66 is being targeted by the seed pool sensor 80 and so used to determine whether the seed cell 66 in the loading zone region 45 (FIG. 10) is filled or vacant. The signal received by the seed pool sensor 80 can be provided to the controller 42 to indicate when the seed meter 32 is about to be starved of a first variety of seed before the controller 42 switches the seed meter 32 to dispense a second variety of seed from an auxiliary hopper or a separate compartment of the hopper 30 or refills the seed chamber 62 with additional seed of the same variety from the hopper 30 or the auxiliary hopper.

In accordance with the present invention, the result of the detection signal of the seed pool sensor 80 can be processed reliably by the processor 44 of the control unit 42 as the detection of either the presence of a seed 51 within the seed cell 66 or a vacant seed cell 66. This information then can be used by the controller 42 as the basis for determining the condition (seed flow or seed starvation) of the seed meter 32 and/or adjusting various operations (e.g., vacuum pressure, speed of rotation of the seed disc 48, when to switch varieties from a multi-variety seed hopper etc.) of the seed meter 32 and ultimately various operations of the planting implement 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A vacuum seed meter, comprising:
   a housing defining a seed chamber wall and a vacuum channel wall;
   a seed disc having seed cells defined as openings through a perimeter region of the seed disc, the seed disc carried by the housing for rotation about a rotational axis and being disposed between the seed chamber wall and the vacuum channel wall, the seed disc spaced apart from the seed chamber wall and the vacuum channel wall to define a seed chamber between the seed disc and the seed chamber wall and a vacuum channel between the seed disc and the vacuum channel wall; and
   a first sensor carried by the housing and aimed at the perimeter region of the seed disc where the seed cells are defined,
   wherein:
   the rotational axis of the seed disc extends through a horizontal centerplane of the seed chamber;
   the seed chamber defines a bottom end such that the seeds tend to move toward the bottom end of the seed chamber due to the influence of gravity; and
   the first sensor is aimed at a targeted portion of the perimeter region located vertically between the bottom end of the seed chamber and the horizontal centerplane of the seed chamber.

2. The vacuum seed meter of claim 1, wherein the first sensor is at least partially disposed within the vacuum channel.

3. The vacuum seed meter of claim 1, further comprising a controller configured to receive signals from the first sensor, the controller being further configured to determine from those signals the detection of an empty seed cell by the first sensor.

4. The vacuum seed meter of claim 1, wherein the first sensor is aimed at a location of the seed cell at the perigee location of the seed disc's rotation adjacent the bottom of the seed chamber.

5. The vacuum seed meter of claim 1, wherein the first sensor is a reflectance style sensor.

6. The vacuum seed meter of claim 1, further comprising a second sensor carried by the housing, wherein the seed disc is disposed so that at any given moment only a first portion of the seed disc is bounded within the vacuum channel while a second portion of the seed disc is bounded outside of the vacuum channel, and wherein the second sensor is aimed at the seed cells in the perimeter region of the seed disc in the second portion that is bounded outside of the vacuum channel.

7. The vacuum seed meter of claim 6, further comprising a controller configured to receive signals from both the first sensor and the second sensor, the controller being further configured to coordinate the sampling of the signals of the first sensor with the detection of an empty seed cell by the second sensor.

8. The vacuum seed meter of claim 7, wherein the controller is configured to determine a frequency at which empty seed cells pass by the second sensor based on the signals received from the second sensor, the controller being further configured to coordinate the sampling of the signals of the first sensor based on the determine frequency.

9. The vacuum seed meter of claim 6, wherein the second sensor is a reflectance style sensor.

10. The vacuum seed meter of claim 6, wherein the second sensor s a break beam style sensor.

11. The vacuum seed meter of claim 6, wherein the second sensor is a capacitive proximity sensor.

12. A vacuum seed meter, comprising:
    a housing defining a seed chamber wall and a vacuum channel wall;
    a seed disc having seed cells defined as openings through a perimeter region of the seed disc, the seed disc carried by the housing and being disposed between the seed chamber wall and the vacuum channel wall; the seed disc spaced apart from the seed chamber wall and the vacuum channel wall to define a seed chamber between the seed disc and the seed chamber wall and a vacuum channel between the seed disc and the vacuum channel wall;
    a first sensor carried by the housing and aimed at the perimeter region of the seed disc where the seed cells are defined;
    a second sensor carried by the housing and aimed at the seed cells in the perimeter region of the seed disc at a different location than the first sensor; and
    a controller configured to receive signals from both the first sensor and the second sensor, the controller being further configured to coordinate the sampling of the signals of the first sensor with the detection of an empty seed cell by the second sensor.

13. The vacuum seed meter of claim 12, wherein the first sensor is at least partially disposed within the vacuum channel.

14. The vacuum seed meter of claim 12, wherein the seed disc defines a rotational axis that extends through a horizontal centerplane of the seed chamber, wherein the seed chamber defines a bottom end such that seeds tend to move toward the bottom end of the seed chamber due to the influence of gravity, and wherein the first sensor is aimed at a targeted portion of the perimeter region located vertically between the bottom end of the seed chamber and the horizontal centerplane of the seed chamber.

15. The vacuum seed meter of claim 14, wherein the first sensor is aimed at a location of the seed cell at the perigee location of the seed disc's rotation adjacent the bottom of the seed chamber.

16. The vacuum seed meter of claim 12, wherein the first sensor is a reflectance style sensor.

17. The vacuum seed meter of claim 12, wherein the second sensor is a break beam style sensor.

18. The vacuum seed meter of claim 12, wherein the seed disc is disposed so that at any given moment only a first portion of the seed disc is bounded within the vacuum channel while a second portion of the seed disc is bounded outside of the vacuum channel, and wherein the second sensor is aimed at the seed cells in the perimeter region of the seed disc in the second portion that is bounded outside of the vacuum channel.

19. The vacuum seed meter of claim 18, wherein the first sensor is aimed at the seed cells in the perimeter region of the seed disc in the first portion of the seed disc that is bounded within the vacuum channel.

20. The vacuum seed meter of claim 12, wherein the controller is configured to determine a frequency at which empty seed cells pass by the second sensor based on the signals received from the second sensor, the controller being further configured to coordinate the sampling of the signals of the first sensor based on the determined frequency.

* * * * *